Jan. 26, 1965 J. E. McDANIEL 3,167,053
ANIMAL HOLDING PEN
Filed July 8, 1963 5 Sheets-Sheet 3

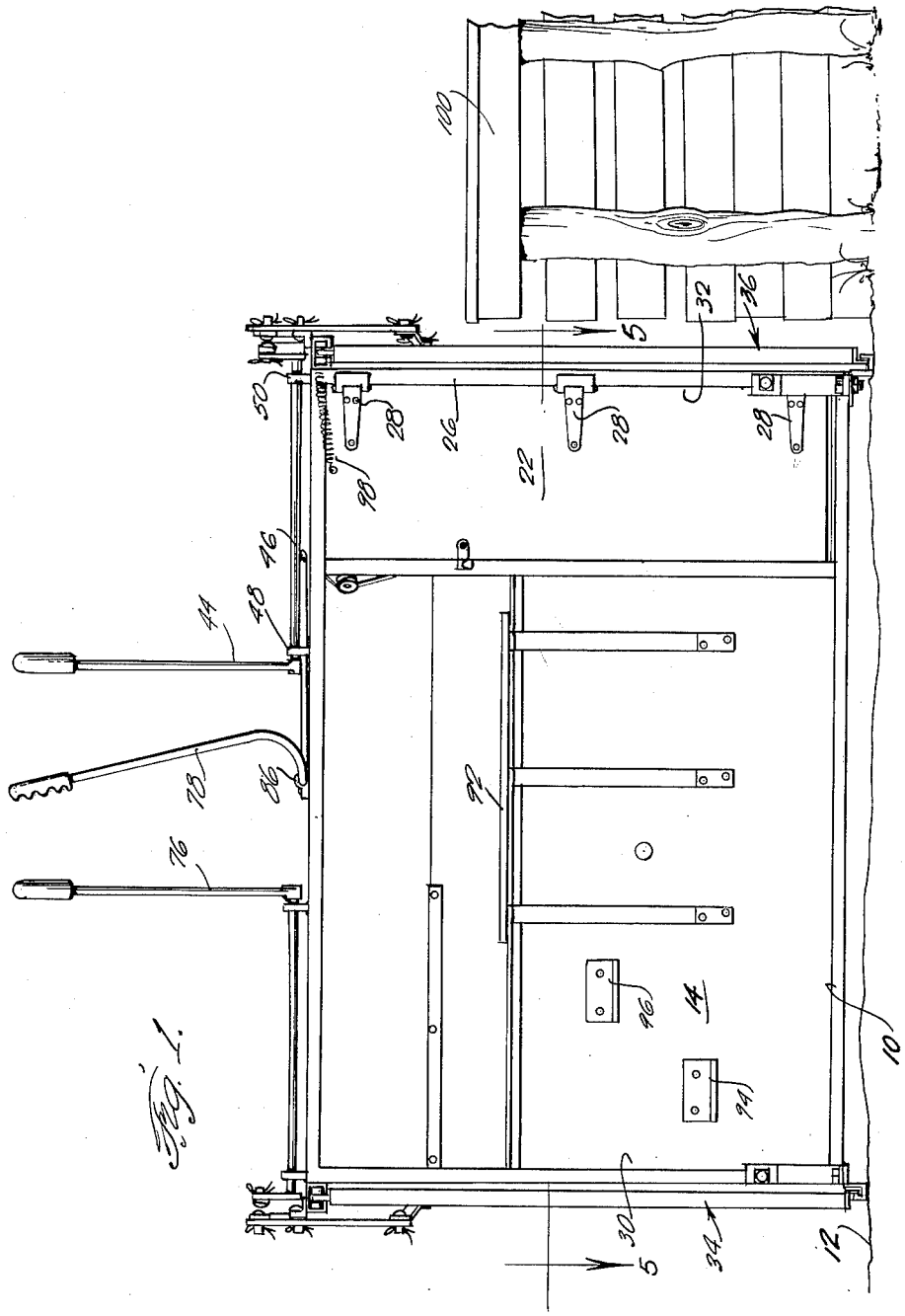

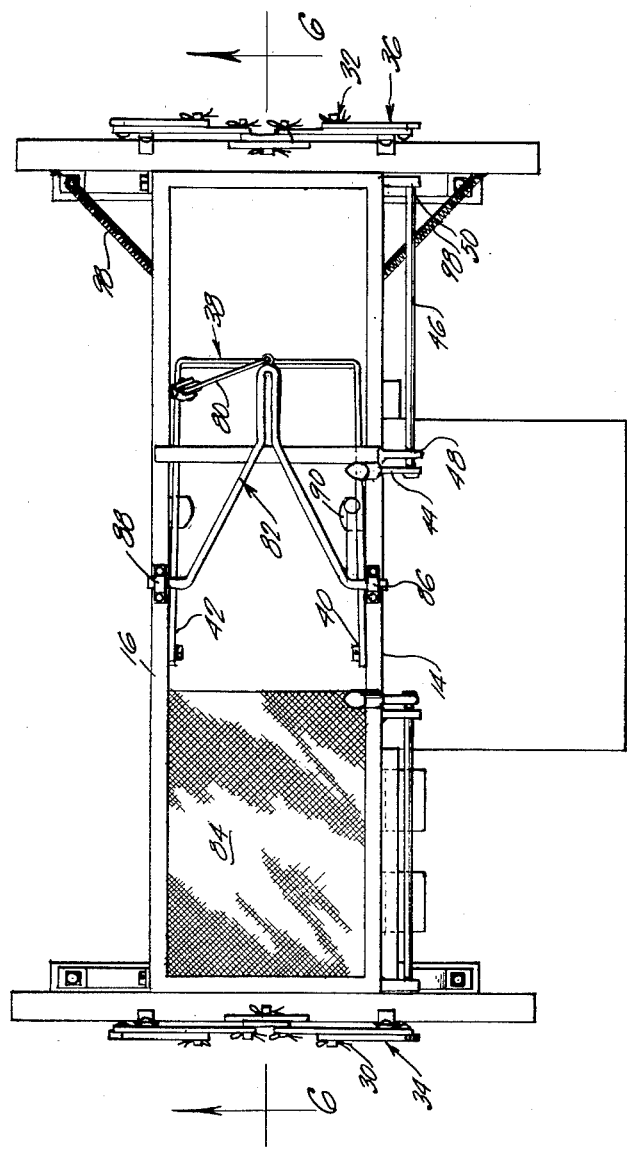

INVENTOR.
JOHN E. McDANIEL
BY
Victor J. Evans & Co.
Attorneys

Jan. 26, 1965  J. E. McDANIEL  3,167,053
ANIMAL HOLDING PEN
Filed July 8, 1963  5 Sheets-Sheet 4
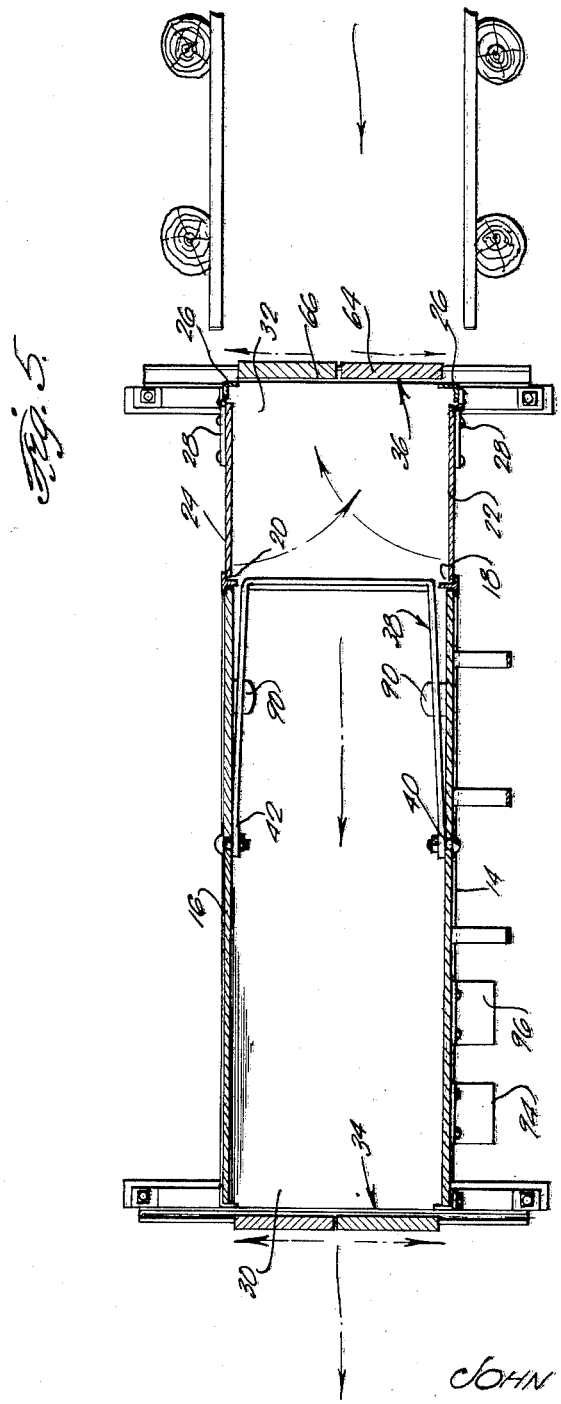
INVENTOR.
JOHN E. McDANIEL
BY
Victor J. Evans & Co.
Attorneys

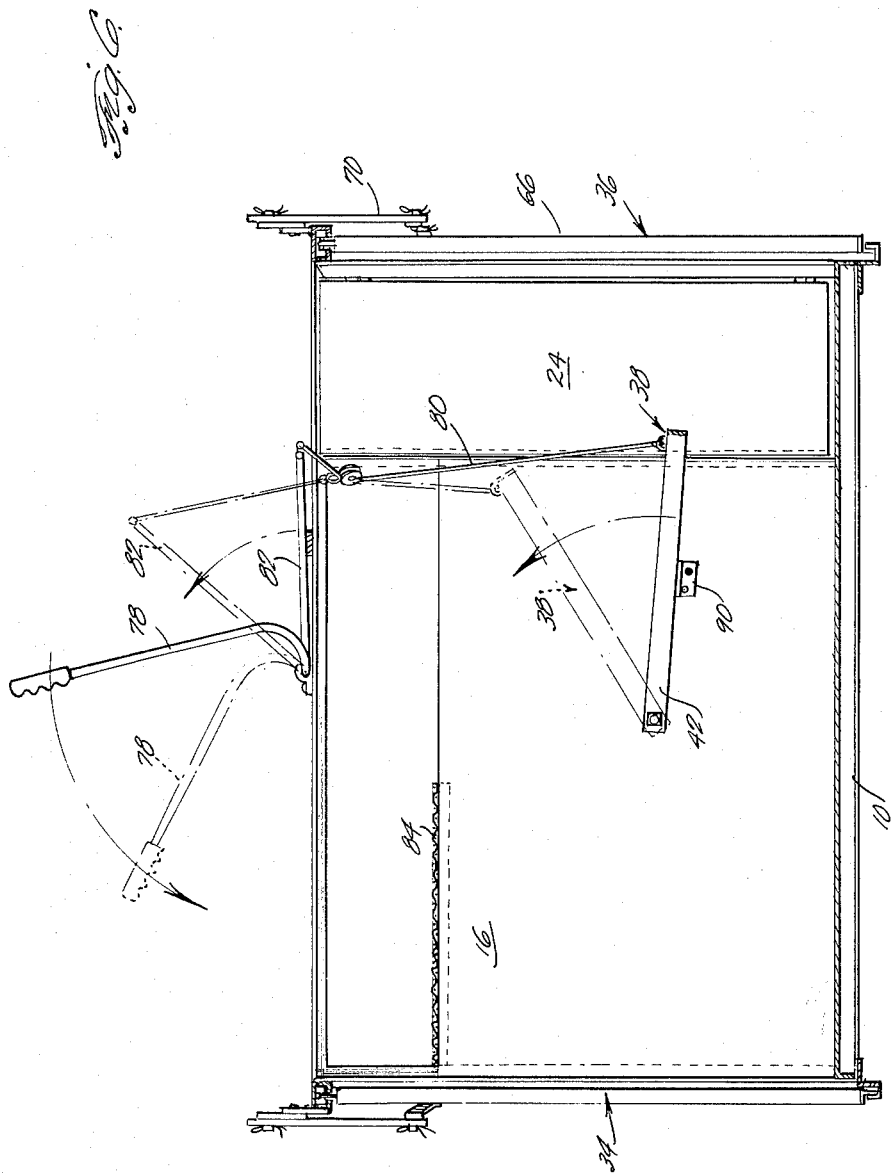

United States Patent Office 3,167,053
Patented Jan. 26, 1965

3,167,053
ANIMAL HOLDING PEN
John E. McDaniel, Box 66, Cimarron, N. Mex.
Filed July 8, 1963, Ser. No. 293,337
5 Claims. (Cl. 119—98)

The present invention relates to an animal holding pen for use with cattle or the like so that an animal can be held for examination, treatment, inoculation, or impregnation.

An object of the present invention is to provide an animal holding pen which is sturdy in construction, one simple in construction, and having long life characteristics, and one which is highly effective in action.

Another object of the present invention is to provide an animal holding pen which is useful for the treatment of cattle, one which may be used for the inoculation of cattle or the impregnation of cattle, and one which provides ready access to an animal when held therein for an operator or technician, the pen of the present invention providing means for protection of the technician or operator when within the pen with the animal.

A further object of the present invention is to provide an animal holding pen of unique and novel design, one which provides working space for an operator with manually operable front and rear gates easily accessible to the operator, and one which has an animal restraining means swingable from a position of use to a position out of use so that an animal can be driven thereunder and later restrained, and one which is economically feasible.

These and other objects and advantages of the present invention will be fully apparent from the following description when considered in conjunction with the annexed drawings, in which:

FIGURE 1 is a side elevational view of the animal holding pen according to the present invention and showing a portion of an animal chute adjacent thereto, FIGURE 2 is a top plan view of the assembly shown in FIGURE 1, FIGURE 3 is an elevational view of one end of the pen of the present invention showing the entrance gate closed, FIGURE 4 is a view similar to FIGURE 3 showing the entrance gate open, FIGURE 5 is a view taken on the line 5—5 of FIGURE 1, and FIGURE 6 is a view taken on the line 6—6 of FIGURE 2.

Referring in detail to the drawings in which like numerals indicate like parts throughout the several views, the animal holding pen of the present invention consists in a base 10 adapted to rest upon a ground surface as indicated by the numeral 12 in FIGURE 1.

A pair of side walls 14 and 16 rise from each of the longitudinal side edges of the base 10 and have their upper ends terminating in the same plane.

Each of the side walls 14 and 16 is provided with an opening as at 18 and 20, respectively, over which are swingably mounted doors 22 and 24, as shown in FIGURE 2.

Each of the doors 22 and 24 are connected to the adjacent frame 26 of the adjacent side wall 14 or 16, by means of hinges 28.

The base 10 has a forward end 30 and a rearward end 32 with a gate structure, designated generally by the reference numeral 34 overlying the forward end of the base 10 and another gate structure, designated generally by the reference numeral 36 overlying the rearward end of the base 10.

Forwardly of the doors 22 and 24 and contiguous thereto is a normally horizontally disposed yoke 38 having its ends 40 and 42 journaled in the side walls 14 and 16, respectively.

Hand actuable means is provided for operating each one of the gate structures 34 and 36 and such means being identical for each of the structures 34 and 36 they will be described with reference to the gate structure 36.

This means includes a lever 44 attached to one end of a shaft 46 which is journaled in bearing members 48 and 50 mounted on the upper end of the frame 26.

On the end of the shaft 46 remote from the lever 44 is an arm 52 to which is secured one end of a toggle bolt assembly 54 which has its other end connected to the mid-portion of a link member 56.

One end of the link member 56 is pivotally connected to a toggle 58 rockably mounted upon the frame 26 and the other end of the link member 56 is pivotally connected to one end of a lever 60 which is rockably mounted on the frame 26 as shown most clearly in FIGURES 3 and 4.

Transversely of the frame 26 at each end thereof is a trackway 62 from which depend doors 64 and 66. The end of the lever 60 remote from the link member 56 is pivotally connected to a bracket 68 connected to the door 64. Another lever 70 has one end pivotally connected to another bracket 72 on the door 66 and has its end remote from the bracket 62 pivotally connected to another link member 74 pivotally connected to the toggle 58.

It will be seen that swinging movement of the lever 44 as a handle, serves to shift the doors 64 and 66 from the closed position shown in FIGURE 3 to the open position shown in FIGURE 4.

The gate structure 34 at the other end of the base 10 is similarly controlled by means of another lever 76 rockably mounted upon the top of the frame 26 as shown in FIGURE 1.

Midway between the levers 44 and 76 is another lever 78 operatively connected to the yoke 38 for effecting the movement of the yoke 38 from the animal restraining position shown in FIGURE 6 in the full lines to the dotted line position in which it is raised upwardly to permit an animal to walk thereunder.

The yoke 38 is connected by a cable or rope 80 to an actuator 82 (FIGURE 2) to which is secured the lever 78. Upon movement of the lever 78 from the full line position to the dotted line position shown in FIGURE 6, the yoke 38 is moved from the substantially horizontal position to the raised position as shown in dotted lines.

The present invention provides a horizontally disposed animal restraining panel 84 positioned between and secured to the side walls 14 and 16 inwardly of and adjacent the forward end 30 of the base 10.

The panel 84 serves to keep the animal from lunging upwardly when confined between the walls 14 and 16 and held against rearward movement by the yoke 38.

The ends of the actuator 82 are mounted in bearing blocks 86 and 88 on the upper end of the frame 26 and brackets 90 on the inner surfaces of the walls 14 and 16 support the yoke 38 in its downward movement position as shown most clearly in FIGURE 6.

On the exterior of the wall 14 is a platform 92 on which an operator may stand while manipulating the levers 44, 78, and 76. Steps 94 and 96 also secured to the wall 14 provide a means for easy access to the platform 92.

A coil spring 98 has one end fastened to each of the doors 22 and 24 and has its other end fastened to an intermediate portion of the trackway 62, such springs 98 biasing the doors 22 and 24 to the closed position but permitting each of the doors to swing inwardly to provide access to the interior of the pen of the present invention for the operator or a technician treating an animal when held between the walls 14 and 16.

In use, the animal holding pen of the present invention is adapted for positioning adjacent one end of an open chute 100 as in FIGURE 1 through which animals are driven one by one. An operator standing on the platform 92 admits the animal by opening the gate structure 36 at one end of the pen by effecting movement of the lever 44. When the animal is within the pen the yoke 38 is dropped to the lowered position behind the animal and then the technician or operator has access to the animal through either of the doors 22 or 24.

When the animal has been treated it is released by opening the structure 34 and the operation is repeated for another animal. It has been found that the apparatus according to the present invention speeds up the treatment of cattle on a large scale so that they may be artificially inseminated in quantity and with ease and facility.

While only a preferred form of the invention is shown and described, other embodiments or forms of the invention are contemplated and numerous changes and modifications may be made in the invention without departing from the spirit thereof as set forth in the appended claims.

What is claimed is:

1. An animal holding pen comprising a base adapted to rest upon a ground surface, said base having a forward end and a rearward end, a side wall rising from each of the longitudinal side edges of said base, an inwardly swinging door hingedly connected to each of said side walls adjacent the rearward end of said base and each door normally extending over a conformably sized opening in said side wall, said doors and openings extending substantially less than one-half the length of the side walls, and an animal restraining yoke having its ends pivotally mounted in said side walls for swinging movement from a raised position above an animal when standing between said side walls to a lowered position behind the rump of said animal when standing between said side walls forwardly of said doors, said doors each providing access to the space behind said animal when standing between side walls with said yoke in the lowered position.

2. An animal holding pen comprising a base adapted to rest upon a ground surface, said base having a forward end and a rearward end, a side wall rising from each of the longitudinal side edges of said base, an inwardly swinging door hingedly connected to each of said side walls adjacent the rearward end of said base and each door normally extending over a conformably sized opening in said side wall, said doors and openings extending substantially less than one-half the length of the side walls, an animal restraining yoke having its ends pivotally mounted in said side walls for swinging movement from a raised position above an animal when standing between said side walls to a lowered position behind the rump of said animal when standing between said sidewalls forwardly of said doors, said doors each providing access to the space behind said animal when standing between said side walls with said yoke in the lowered position, and a horizontally disposed animal restraining panel positioned between and secured to said side walls inwardly of and adjacent the forward end of said base.

3. An animal holding pen comprising a base adapted to rest upon a ground surface, said base having a forward end and a rearward end, a side wall rising from each of the longitudinal side edges of said base, an openable and closable gate disposed at each end of said base, an inwardly swinging door hingedly connected to each of said side walls adjacent the rearward end of said base and each door normally extending over a conformably sized opening in said side wall, said doors and openings extending substantially less than one-half the length of the side walls, and an animal restraining yoke having its ends pivotally mounted in said side walls for swinging movement from a raised position above an animal when standing between said side walls to a lowered position behind the rump of said animal when standing between said side walls, said doors each providing access to the space behind said animal when standing between said side walls with said yoke in the lowered position.

4. An animal holding pen comprising a base adapted to rest upon a ground surface, said base having a forward end and a rearward end, a side wall rising from each of the longitudinal side edges of said base, an openable and closable gate disposed at each end of said base, hand actuable means operatively connected to each of said gates for effecting the movement thereof, an inwardly swinging door hingedly connected to each of said side walls adjacent the rearward end of said base and each door normally extending over a conformably sized opening in said side wall, said doors and openings extending substantially less than one-half the length of the side walls, an animal restraining yoke having its ends pivotally mounted in said side walls for swinging movement from a raised position above an animal when standing between said side walls to a lowered position behind the rump of said animal when standing between said side walls, said doors each providing access to the space behind said animal when standing between said side walls with said yoke in the lowered position, and a horizontally disposed animal restraining panel positioned between and secured to said side walls inwardly of and adjacent the forward end of said base, hand actuable means operatively connected to said yoke, means mounting all of said hand actuable means at the top of said side walls, and an elevated operator's platform on one of said side walls for supporting a person while operating the hand actuable means.

5. The structure as defined in claim 4 together with spring means operatively interconnecting said doors and side walls for biasing said doors to closed position, said end gates being slidable in vertical disposed trackways carried by said side walls.

References Cited in the file of this patent

UNITED STATES PATENTS

| | | |
|---|---|---|
| 1,009,714 | Batchelder | Nov. 28, 1911 |
| 1,436,897 | Novak | Nov. 28, 1922 |
| 2,786,449 | Dahlerup | Mar. 26, 1957 |
| 2,851,993 | Hettinger | Sept. 16, 1958 |